Patented Nov. 21, 1933

1,935,949

UNITED STATES PATENT OFFICE 1,935,949

OXIDATION OF AROMATIC COMPOUNDS

Filip Kačer, Mannheim, Germany, assignor to General Aniline Works, Inc., New York, N. Y., a corporation of Delaware No Drawing. Application December 11, 1930, Serial No. 501,675, and in Germany December 14, 1929

5 Claims. (Cl. 260—61)

The present invention relates to an improved process of oxidizing aromatic methyl and methylene compounds.

I have found that methyl or methylene groups attached to aromatic compounds are readily oxidized to aldehyde, carboxyl or keto groups by heating aromatic methyl or methylene compounds with oxygen compounds of selenium, for example selenious acid and selenic acid. By means of the said oxidizing agents it is possible to oxidize the methyl and methylene groups which are attached to ring systems which are sensitive to the usual oxidizing agents, into aldehyde, carboxyl or keto groups, while protecting the said ring systems. Thus, the hitherto unknown class of benzanthrone aldehydes may be prepared by the process according to the present invention. The reaction may be carried out while suspending the reagents in water or in an organic solvent, such as for example glacial acetic acid and nitrobenzene.

The following examples will further illustrate how the said invention may be carried out in practice, but the invention is not restricted to these examples. The parts are by weight.

Example 1

244 parts of 2-methylbenzanthrone, 170 parts of selenious acid and 1000 parts of water are heated to from 230° to 240° C. for 4 hours in an autoclave. After cooling, the reaction product is filtered off by suction and washed with water in order to remove the excess of selenious acid. The residue consists of the hitherto unknown benzanthrone-2-aldehyde and selenium. The separation of the benzanthrone-2-aldehyde from the selenium may be easily effected by means of organic solvents. The pure aldehyde forms yellow crystals which dissolve in concentrated sulphuric acid giving a red coloration. From hot solution in glacial acetic acid, an extremely difficultly soluble yellow aldazine is precipitated by the addition of hydrazine hydrate. The aldehyde is a valuable initial material for the preparation of dyestuffs.

If 6-methylbenzanthrone be employed in this example, instead of 2-methylbenzanthrone, benzanthrone-6-aldehyde, which likewise was hitherto unknown, is obtained. The said aldehyde dissolves in concentrated sulphuric acid to give a yellow solution, dissolves in hot glacial acetic acid from which solution a yellow aldazine melting at about 346° C. is precipitated by the addition of hydrazine hydrate.

Example 2

49 parts of 2-methylbenzanthrone, 1000 parts of glacial acetic acid and 60 parts of concentrated selenic acid are boiled for 8 hours under a reflux condenser. The brown solution is poured into water and the reaction product which separates out is filtered off, washed with water until neutral and dried. Pure benzanthrone-2-aldehyde is obtained therefrom by crystallization from organic solvents.

Example 3

49 parts of 2-methylbenzanthrone and 67 parts of selenious acid are boiled for 5 hours in 500 parts of nitrobenzene. The excess of nitrobenzene is then removed by distillation with steam. The residue is pulverized and extracted with dilute caustic soda solution. The benzanthrone-2-carboxylic acid may be precipitated from the resulting extract with hydrochloric acid.

Example 4

12 parts of 5-methylnaphthanthraquinone, obtainable by condensing 1-methylnaphthalene with phthalic acid anhydride and treating the methylnaphthoylbenzoic acid obtained with sulphuric acid, are heated for 4 hours at 240° C. in an autoclave with 25 parts of selenious acid and 25 parts of water. After cooling, the reaction product is filtered off by suction and washed until neutral. By extraction with dilute caustic soda solution and precipitation of the extract with hydrochloric acid, the hitherto unknown naphthanthraquinone-5-carboxylic acid is obtained, which forms yellow needles when crystallized from trichlorbenzene. From the residue which is insoluble in alkali, the hitherto unknown naphthanthraquinone-5-aldehyde which forms yellow needles may be recovered, for example by crystallization from glacial acetic acid. It yields a very difficultly soluble orange yellow aldazine with hydrazine. By suitable choice of the reaction conditions it is possible to produce mainly aldehyde or mainly carboxylic acid.

Example 5

16 parts of 2-benzylbenzanthrone are heated for 4 hours in a pressure-tight vessel to from 230° to 240° C. with 20 parts of selenious acid and 200 parts of water. The reaction product is very pure 2-benzoylbenzanthrone. It is obtained in the form of yellow needles by crystallization from glacial acetic acid.

Example 6

36 parts of 1.5-dibenzoyl-2.6-dimethylnaphthalene (prepared for example as described in the Berichte der Deutschen Chemischen Gesellschaft, volume 62, page 953) are boiled for 7 hours with 50 parts of selenious acid in 500 parts of nitrobenzene. The nitrobenzene is then removed by distillation with steam and the residue is extracted with dilute caustic soda solution. The hitherto unknown 1.5-dibenzoylnaphthalene-2.6-dicarboxylic acid, which when crystallized from glacial acetic acid yields almost colorless pale yellow crystals may be precipitated from the extract with hydrochloric acid.

What I claim is:

1. The process of oxidizing aromatic compounds which comprises heating an aromatic compound containing a methyl or methylene group with an oxygen compound of selenium thereby effecting the oxidation by means of the oxygen contained in the said selenium compound.

2. The process of producing benzanthrone aldehydes, which comprises heating a methylbenzanthrone with an oxygen compounds of selenium.

3. Benzanthrone aldehydes forming yellow crystals, soluble in concentrated suphuric acid and forming with hydrazine hydrate aldazines very difficultly soluble in glacial acetic acid.

4. Benzanthrone-2-aldehyde forming yellow crystals, dissolving in concentrated suphuric acid to give a red solution, dissolving in hot glacial acetic acid and being precipitated from this solution in the form of an extremely difficulty soluble yellow aldazine by the addition of hydrazine hydrate.

5. Benzanthrone-6-aldehyde forming yellow crystals, dissolving in concentrated sulphuric acid to give a yellow solution, dissolving in hot glacial acetic acid and being precipitated from this solution in the form of an extremely difficultly soluble yellow aldazine by the addition of hydrazine hydrate.

FILIP KAČER.